United States Patent [19]

Nagano

[11] Patent Number: 4,617,006
[45] Date of Patent: Oct. 14, 1986

[54] FRONT DERAILLEUR FOR A BICYCLE
[75] Inventor: Masashi Nagano, Izumi, Japan
[73] Assignee: Shimano Industrial Company Limited, Osaka, Japan
[21] Appl. No.: 666,323
[22] Filed: Oct. 30, 1984
[30] Foreign Application Priority Data Nov. 4, 1983 [JP] Japan .................... 58-171426[U]

[51] Int. Cl.⁴ ............... F16H 11/08; F16H 11/00; F16H 7/22
[52] U.S. Cl. .................... 474/80; 474/78; 474/82
[58] Field of Search ................... 474/78-83
[56] References Cited

U.S. PATENT DOCUMENTS

| 3,890,847 | 6/1975 | Dian | 474/80 |
| 4,194,409 | 3/1980 | Nagano | 474/80 |
| 4,279,605 | 7/1981 | Egami | 474/82 |
| 4,452,593 | 6/1984 | Coue | 474/80 |
| 4,479,787 | 10/1984 | Bonnard | 474/82 |
| 4,486,182 | 12/1984 | Coue | 474/80 |

FOREIGN PATENT DOCUMENTS 2654426 6/1977 Fed. Rep. of Germany.
2830493 1/1979 Fed. Rep. of Germany.

Primary Examiner—John Petrakes
Attorney, Agent, or Firm—Stevens, Davis, Miller & Mosher

[57] ABSTRACT

A front derailleur for a bicycle includes a chain guide and a moving member for moving the chain guide axially of a multistage front chain gear assembly so that a control wire is operated to switch a driving chain guided by the chain guide from one front chain gear to another. A swinging member has one end which includes a support for supporting the control wire or an outer sheath therefor. The swinging member is pivoted at an intermediate portion thereof to the moving device. An adjusting mechanism is located between the other end of the swinging member and the moving member to adjust the position of the swinging member with respect to the moving member and to adjust the position of the chain guide with respect to each front chain gear.

7 Claims, 5 Drawing Figures

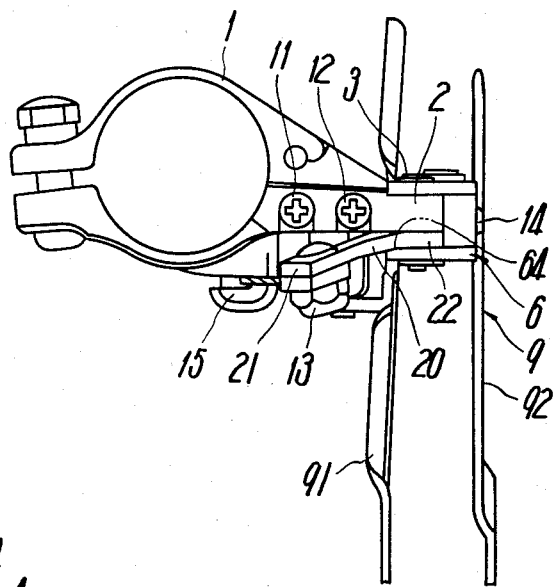
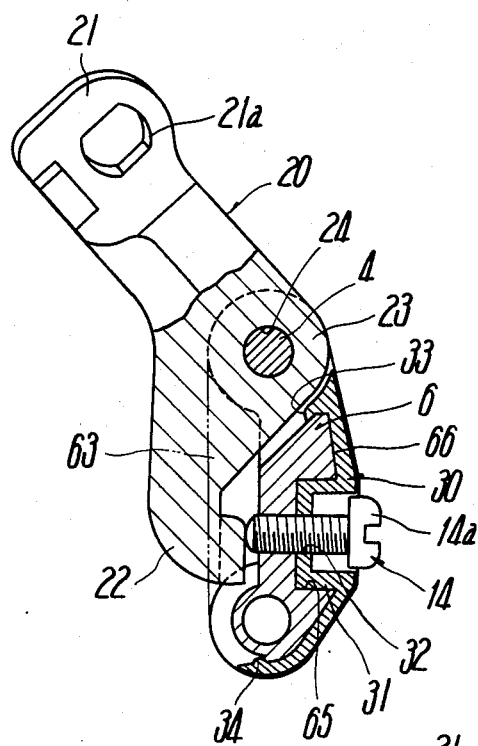
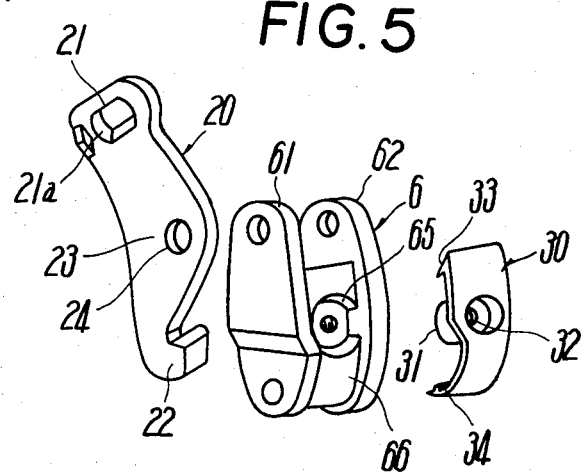

FRONT DERAILLEUR FOR A BICYCLE

FIELD OF THE INVENTION

This invention relates to a front derailleur for a bicycle, and more particularly to a front derailleur for a bicycle, which uses a control wire to switch a driving chain from one front chain gear to another at a multistage front chain gear assembly.

BACKGROUND OF THE INVENTION

Generally, the above type of front derailleur includes a chain guide, a base member fixed to a seat tube at the bicycle frame, a pair of linkage members pivoted to the base member, and a moving means for reciprocating the chain guide axially of the multistage chain gear assembly. Between the chain guide and the base member or one of two linkage members is interposed a return spring for biasing the chain guide in the direction of the backward movement. The base member screws with a pair of regulation screws for regulating a range of swinging motion of each linkage member, and in turn a range of swinging motion of the chain guide. The outer linkage member has an end which extends outwardly at the base member side. An operating wire is connected one end to a speed change operating lever and is mounted at its other end to the aforesaid extending end of the outer linkage member. The operating wire is pulled by an operating lever so that the chain guide moves forwardly against a spring force of a return spring and reaches the position corresponding to a high speed front chain gear, and the operating wire is released to return the chain guide by a restoring force of the return spring to the position corresponding to a low speed front chain gear.

The front derailleur sets the chain guide in position with respect to the front chain gear by use of a positioning means at a speed-change operating device such as a positioning mechanism provided between the operating lever and a member rotatable relative thereto and comprising a plurality of recesses and a rolling member engageable with one of the recesses, or by a display unit and indication unit.

However, when the operating wire is elongated by repeated speed-change operation by the lever the motion of the chain guide at the front derailleur becomes out of proper adjustment with respect to the movement of the lever, in other words, the amount of movement of the chain guide is insufficient with respect to the stroke the operating lever to place the chain guide at the desired gear, thereby creating a problem in that the driving chain cannot be switched to a desired front chain gear with accuracy.

SUMMARY OF THE INVENTION

An object of the invention is to provide a front derailleur which can switch a driving chain to a desired front chain gear with accuracy even when an operating wire becomes elongated due to repetition of the speed change operation. In detail, in addition to the chain guide and a moving means for moving the same axially of the front chain gear, a swinging member, which is swingable independently of the chain guide and the moving means, and an adjusting means, such as an adjusting screw, are used. The swinging member supports one end of the operating wire or the outer sheath therefor, so that the adjusting means adjusts the swinging member in position with respect to the moving means, thereby enabling the amount of extension of the operating wire to be compensated or absorbed.

This invention is characterized in that a swinging member is formed which has first and second ends. The swinging member supports at its first end the control wire or the outer sheath therefor. The moving means is pivoted to an intermediate portion of the the swinging member, and between the second end of swinging member and the moving means is provided an adjusting means which adjusts the position of the swinging member with respect to the moving means and the position of the chain guide with respect to the respective front chain gears, thereby solving the abovementioned problem.

Hence, when the control wire becomes elongated through repeated use, the adjusting means is operated to compensate an amount of extension of the wire, and the chain guide is then made to be movable in an amount corresponding to an operation stroke of control wire, thereby enabling the driving chain to be guided by the chain guide and switched to a desired front chain gear with accuracy. Furthermore, the swinging member is pivoted at its intermediate portion to the moving means so that swinging motion of the swinging member or the linkage member with respect thereto, is adjustable of the amount of extension by use of a lever ratio, resulting in a smaller amount of adjustment by the adjusting means to thereby enable quick and easy operation of the adjustting means.

These and other objects of the invention will become more apparent in the detailed description and examples which follow.

BRIEF DESCRIPTION OF THE INVENTION

FIG. 3 is a plan view of the same,

FIG. 4 is an enlarged sectional view of the principal portion only of the FIG. 1 embodiment, and FIG. 5 is a perspective exploded view of the principal portion of the FIG. 1 embodiment.

DETAILED DESCRIPTION OF THE INVENTION

Figure 1:
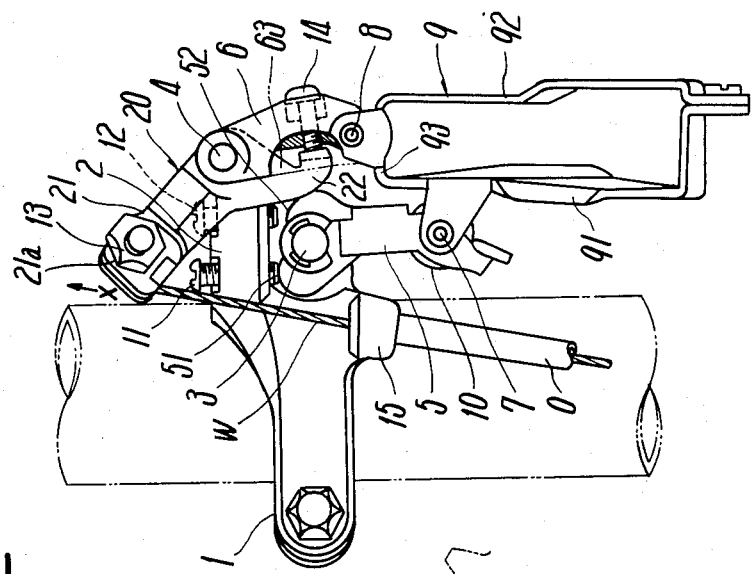
FIG. 1 is a front view of an embodiment of a front derailleur of the invention.

Referring to the drawings, a front derailleur is provided with a base member 2 fixed to a seat tube S at the bicycle through a tightening band 1, an inner linkage member 5 and an outer linkage member 6 pivoted at their upper ends to the base member 2 through two pivot pins 3 and 4, and a chain guide 9 having an inner plate 91 and an outer plate 92 opposite to each other and a bridge 93 for connecting the inner and outer plates 91 and 92, thereby forming a moving means for moving the chain guide 9 axially of a multistage front chain gear assembly FG. The chain guide 9 is supported swingably to the lower ends of linkage members 5 and 6 through two pivot pins 7 and 8 so as to constitute a linkage mechanism formed of base member 2, linkage members 5 and 6 and chain guide 9. A return spring 10 is interposed between the inner plate 91 and the inner linkage member 5 to bias the chain guide 9 toward a low speed front chain gear. A pair of regulation screws 11 and 12 screw with the base member 2, and first and second stoppers 51 and 52 opposite to the regulation screws 11 and 12 are provided at the end of inner linkage member 5 at the base member side thereof and are spaced at a predetermined interval in the direction of swinging motion of inner linkage member 5, the regulation screws 11 and 12 being adjusted to regulate a swinging range of inner linkage member 5, and in turn a swinging range of the chain guide 9. Accordingly, chain guide 9 is stopped at the position corresponding to the low speed front chain gear $FG_1$ or a high speed front chain gear $FG_2$. In such construction, the control wire W is pulled to swing the linkage members 5 and 6 against the return spring 10 through a swinging member to be discussed below and to shift the chain guide 9 axially of the multistage front chain gear assembly FG and toward the high speed front chain gear $FG_2$. On the other hand, the control wire is released to return the chain guide 9 toward the low speed front chain gear $FG_1$ by means of a restoring force of return spring 10. Thus, the chain can be switched to any desired one of the front chain gears through reciprocation of chain guide 9.

The embodiment of the front derailleur of the invention shown in the drawings is provided with a bellcrank-shaped swinging member 20 which has first and second ends 21 and 22, and has at the first end 21 a support portion 21a for supporting the control wire W and outer sheath O therefor and at an intermediate bent portion 23 between the first and second ends 21 and 22 a through bore 24 through which pivot pin 4 passes, the bent portion 23 being pivoted to the base member 2 through the pivot pin 4. The support portion 21a is provided with a fixture 13 for fixing therewith the control wire W. Second end 22 is opposite to the inner surface of outer linkage member 6. An adjusting screw 14 is screwed with the opposite portions of second end 22 and outer linkage member 6 with the head of screw 14 being outwardly disposed so that screw 14 can be screwed from the outside of outer linkage member 6 to adjust the swinging member 20 in position with respect to the outer linkage member 6, and in turn the chain guide 9 in position with respect to each front chain gear, thus absorbedly compensating the amount of extension of control wire W fixed to the support portion 21a. In addition, the outer sheath O is supported to a holder 15 at the base member 2.

The length of swinging member 20 between the intermediate through bore 24 and the second end 22 is shorter than that between through bore 24 and the support portion 21a so that the amount of movement of second end 22 is less than that of support portion 21a. As a result, when the control wire W is elongated, the adjusting screw 14 is adapted to be less operable relative to an amount of extension of wire W.

The outer linkage member 6, as shown in FIG. 5, is formed furcate at its end which is pivoted to the base member. Base member 2 in part and the intermediate bent portion of swinging member 20 are interposed between the furcate ends 61 and 62, so that the furcate ends 61 and 62 and swinging member 20 are supported to the base member 2 through the pivot pin 4. Also, the outer linkage member 6 has an extension 63 at one side widthwise thereof extending toward the seat tube S side and a guide surface 64 opposite to the swinging member 20 is provided at the inside surface of extension 63, thereby allowing the swinging member 20 to swing with stability and protecting the same. A recess 65 receiving the head 14a of adjusting screw 14 is provided at the outer surface of outer linkage member 6 and at the screw 14 mounting portion of the same, so that the adjusting screw 14 screwably passing through the outer linkage member 6 is exposed at the head 14a so as to be easy to operate from the exterior. Also, the outer linkage member 6 provides a holding recess 66 extending lengthwise of linkage member 6 from the recess 65, and a cover 30 of synthetic resin and having a bottomed cylinder 31 is fitted onto the holding recess 66 and recess 65. Cover 30 is provided at the bottom of cylinder 31 with a bore 32 of a smaller diameter than a major diameter of screw 14 so that the adjusting screw 14 forcibly screws with the bore 32 to thereby utilize the elasticity of the resin material to prevent the screw 14 from being loose. Cover 30 is, and also retained at both lengthwise edges to both ends of holding recess 66 to prevent the cover 30 from escaping therefrom. Alternatively, a gap between the bridge 93 and the cover 30 may be made smaller than the extent of engagement of edge 34 of cover 30 with the edge of recess 66, so that even when the edge 33 of cover 30 escapes from the edge of recess 66, the cover 30 will not drop out.

The outer linkage member 6 is formed of light metal or the like, and the cover 30 of black synthetic resin, thereby having a good two-tone appearance.

The front derailleur of the invention constructed as as described above is fixed to the seat tube at the bicycle frame through a tightening band 1. Regulation screw 11 at the low-speed side regulates a swinging range of chain guide 9 toward the low speed chain gear $FG_1$ through the inner linkage member 5. In this state, the control wire W connected at one end with the operating lever is mounted at the other end to the support portion 21a through the fixture 13, the outer sheath O is supported to the holder 15, the operating lever is operated to pull the control wire W to move the chain guide 9 toward the high speed front chain gear $FG_2$, and the regulation screw 12 at the top-speed side actuates the chain guide 9 through the inner linkage member 5, thereby regulating the moving range of chain guide 9 toward the high speed front chain gear $FG_2$. Then, the operating lever is operated to move the chain guide 9 forwardly or backwardly through the control wire W to switch the front derailleur to a desired speed change stage.

In a case where the control wire W is elongated due to repetition of the speed change operation, the operating lever at the speed change operating device having a positioning means is turned to the middle speed stage of the positioning means and the chain guide 9 is stopped at the position corresponding to the middle speed front chain gear $FG_3$. In this state, the adjusting screw 14 is screwably operated from the exterior by use of an operating means, such as a screw driver. In this case, since the swinging member 20 is smaller in the amount of movement of second end 22 than the support portion 21a, an amount of operation of adjusting screw 14 is smaller than the amount of extension of control wire W, thereby enabling quick and easy adjustment by the screw 14 to that extent. Also, the adjusting screw 14, which is operable from the exterior, is very easy to control.

Figure 2:
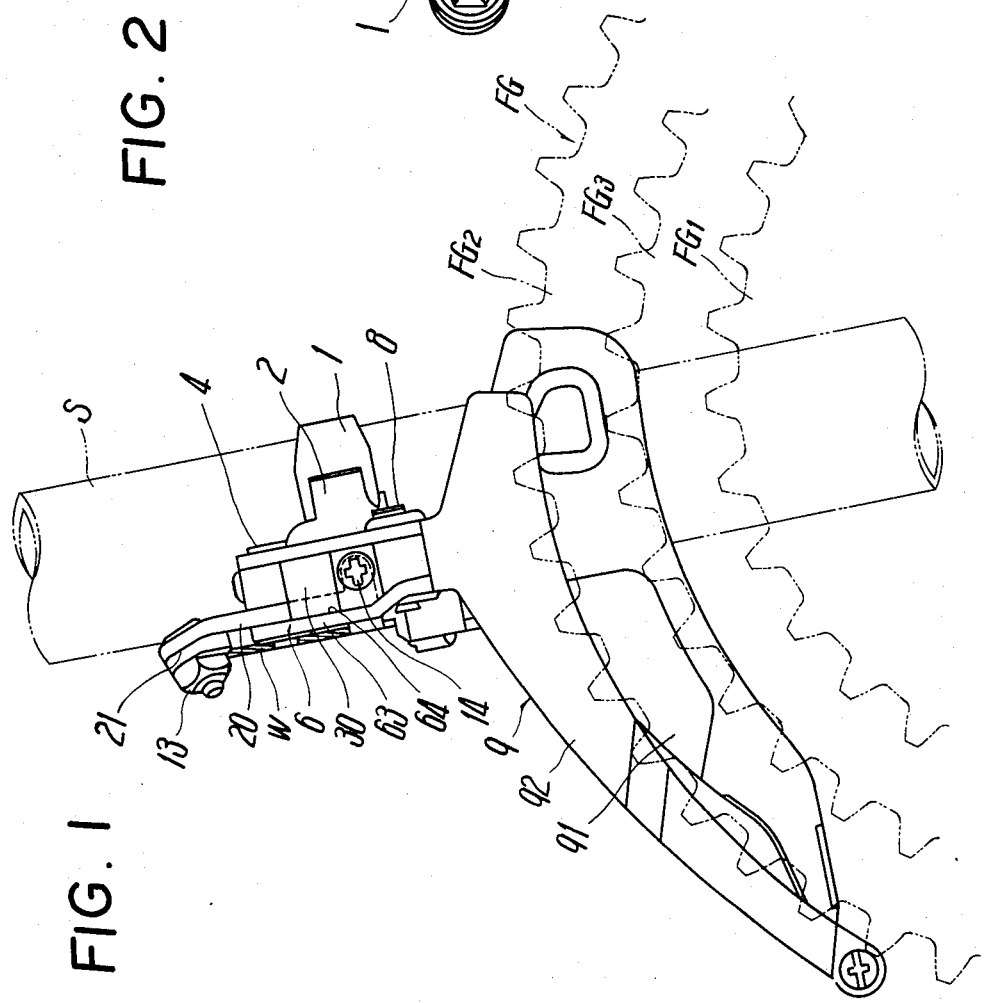
FIG. 2 is a partially cutaway side view of the FIG. 1 embodiment.

The adjusting screw 14 to swing the swinging member 20 clockwise in FIG. 2 and adjust it in position with respect to the outer linkage member 6, thereby pulling the wire W in the direction of the arrow X in FIG. 2 to absorb an amount of extension of wire W. Hence, the chain guide 9 is movable accurately corresponding to the stroke of wire W. Specifically, when the operating lever is operated to drive the front and rear chain gears and switch the driving chain from the low speed front chain gear $FG_1$ to the middle speed gear $FG_3$, and then to the high speed front chain gear $FG_2$ from middle speed gear $FG_3$, the swinging member 20 is adjusted in position with respect to the outer linkage member 6 to eliminate noises produced by contact of the chain with the front derailleur. In addition, the reason for stopping the chain guide 9 at the position corresponding to the middle speed front chain gear $FG_3$ to adjust the swinging member 20 in position with respect to the outer linkage member 6 is that for the multistage front chain gear assembly of three or more speed change stage, when the chain is switched from the low speed front chain gear $FG_1$ to the middle speed gear $FG_3$, the chain guide 9 should be overshifted from the gear $FG_3$ toward the high speed front chain gear $FG_2$, and when the chain is switched from the middle speed one $FG_3$ to the high speed gear $FG_2$, there is no need of overshift, whereby the chain guide 9 is stopped at the position corresponding to the middle speed gear $FG_3$ and adjusted to reduce an error in position of chain guide 9 with respect to each front chain gear.

Alternatively, the aforesaid embodiment may use a four-link mechanism comprising, for example, the base member 2, two linkage members 5 and 6 each pivoted at one end to the base member 2, and a movable member (not shown) pivoted to the other ends of linkage members 5 and 6, with the chain guide 9 being fixed to the movable member.

Also, the swinging member 20 may alternatively be (1) pivoted to the base member 2 through the pivot pin 3 or a pivoting means, such as a pin, separate from the pivot pins 3 and 4 (2) pivoted to the linkage member 5 or 6 or the pivot pin 7 or 8; (3) pivoted to the movable member at the four linkage mechanism. The swinging member 20, however, is pivoted to one of pivot pins 3, 4, 7 and 8 to allow the second end 22 and adjusting screw 14 at the outer linkage member 6 or inner linkage member 5 to swing in a concentric manner, thereby preventing the contact portion of adjusting screw 14 and swinging member 20 from moving relative to each other. Hence, the swinging member 20 and adjusting screw 14 are not subjected to any excessive forces and are not required to be made of highly durable material, thus resulting in a low manufacturing cost.

Alternatively, the second end 22 at the swinging member 20 may be opposite to the base member 2, the inner linkage member 5, or the movable member at the four-link mechanism. In a case where the second end 22 is opposite to the base member 2 and the adjusting screw 14 is provided between the second end 22 and the base member 2, for example, the base member 2 is pivoted to the swinging member 20 and the support portion 21a thereof supports the outer sheath O. In this case, the control wire W is fixed to an extension of outer linkage member 6 extending outwardly at the pivot side to the base member 2.

Also, the swinging member 20 may alternatively support the outer sheath O and the control wire W may be mounted to, for example, the base member 2.

Also, the adjusting means may use a cam body, which is not particularly defined in construction.

While a preferred embodiment of the invention has been described using specific terms, such description is for illustrative purpose only, and it is to be understood that changes and variations may be made without departing from the spirit or scope of the following claims.

What is claimed is:

1. A front derailleur for a bicycle which is operated by a control wire to switch a driving chain from one front chain gear to another at a multistage front chain gear assembly, said front derailleur comprising:
   a chain guide,
   a moving means for allowing said chain guide to move axially of said multistage front chain gear assembly,
   a swinging member which has first and second end portions, said first end portion comprising a support portion for supporting one of said control wire and an outer sheath for guiding said control wire, said swinging member being pivotally supported at an intermediate portion thereof located between said first and second end portions to said moving means, and .
   an adjusting means disposed between said second end of said swinging member and said moving means, said adjusting means for adjusting a position of said swinging member with respect to said moving means to adjust a position of said chain guide with respect to each of said front chain gears.

2. A front derailleur for a bicycle as set forth in claim 1, wherein said moving means comprises a linkage mechanism comprising a base member, an inner linkage member and an outer linkage member, said inner linkage member and said outer linkage member each being pivoted at one end thereof to said base member and at another end thereof to said chain guide, said swinging member being pivoted to one member of said linkage mechanism.

3. A front derailleur for a bicycle as set forth in claim 2, wherein said swinging member is pivoted to said base member, the second end portion of said swinging member being opposite to one of said linkage members, said adjusting means being disposed between said swinging member and said linkage member.

4. A front derailleur for a bicycle as set forth in claim 3, wherein said swinging member is supported swingably to said base member through a pivot pin through which one of said linkage members is pivoted to said base member.

5. A front derailleur for a bicycle as set forth in claim 3, wherein the second end portion of said swinging member is disposed opposite to an inner surface of said outer linkage member, said adjusting means including an adjusting screw, said adjusting screw passing through said outer linkage member and being supported from an outer surface to the inner surface of said outer linkage member, said adjusting screw having a head portion exposed outwardly from the outer surface of said outer linkage member.

6. A front derailleur for a bicycle as set forth in claim 5, wherein said inner surface of said outer linkage member includes a guide surface which receives and guides the second end portion at said swinging member.

7. A front derailleur for a bicycle as set forth in claim 5, wherein said outer surface of said outer linkage member includes a cover of synthetic resin, said cover including a threaded bore formed by screwing engagement with said adjusting screw to provide a through bore in said cover for preventing said adjusting screw from becoming loose from said outer linkage member.

* * * * *